United States Patent Office 2,971,156
Patented Feb. 7, 1961

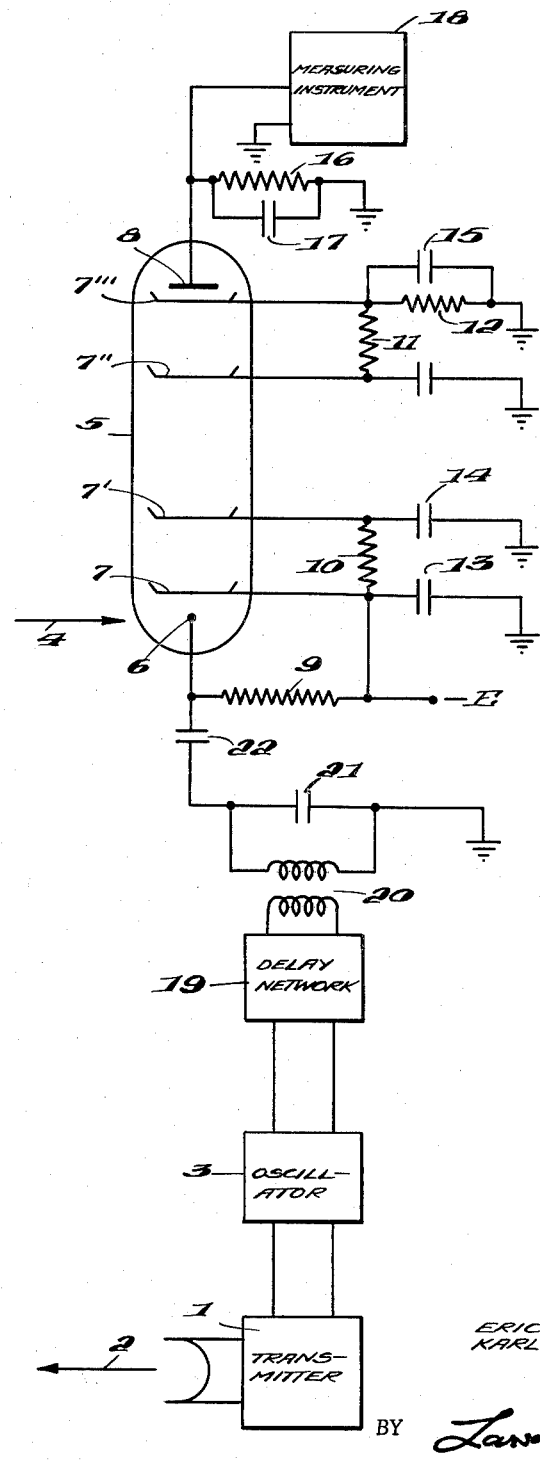

2,971,156

ARRANGEMENT FOR PHASE MEASUREMENT ON LIGHT OSCILLATIONS

Erik O. Bergstrand, Danderyd, and Karl Otto Ragnar Schöldström, Lidingo, Sweden, assignors to Svenska Aktiebolaget Gasaccumulator, Lidingo, Sweden, a corporation of Sweden Filed Jan. 24, 1957, Ser. No. 636,203

Claims priority, application Sweden Dec. 12, 1956

3 Claims. (Cl. 324—83)

The invention refers to a phase measuring arrangement, which is of special importance in distance measurements with the aid of modulated light or other radiation. In such a measuring arrangement the light traverses the length to be measured, whereupon the phase of the impressed modulation oscillation is compared for the emitted and the received light. The latter actuates a photomultiplier, the sensitivity of which is varied at the same frequency as that with which the light is modulated.

The variation of the sensitivity of the multiplier has hitherto been done by means of a control voltage of the frequency of the l.ght modulation, which was impressed on the anode. This has the advantage that the efficiency is good, owing to the fact that the anode has a typical saturation characteristic, that is to say, for positive voltages the current rapidly attains its maximum value as determined by the light flow, whereas for negative voltages no current reaches the anode. The high efficiency decreases the influence of disturbances. On the other hand this method of modulation has appreciable disadvantages. Owing to the low velocity of the electrons in comparison with that of light, a not negligible time interval passes from the moment at which a photon hits the cathode until the electron current resulting from this is blocked or admitted to the anode circuit. In practical embodiments it can be ascertained that the equivalent light path corresponding to the transit time is of the order of five metres.

According to the present invention the disadvantage referred to is overcome to an essential degree through the application of the modulation oscillation to the multiplier while a constant voltage is maintained between the anode and one or more dynodes. Ordinarily, the optimum effect will be achieved if the oscillation is applied to the cathode. The dynodes are then suitably given constant biases and this applies also to the anode. It is however possible, too, to have one or more of the dynodes nearest to the cathode participate in the oscillations of the cathode. Since the electron current between the cathode and the first dynode is a linear function of the voltage, a greater modulation voltage is required for a certain desired sensitivity in this case, but this disadvantage is also balanced by the diminished dependency on the transit time, so that the result is a substantially greater accuracy owing to the fact that the transit time between the first dynode and the anode is without influence on the result of the demodulation process.

An embodiment of the invention in its application to distance measuring arrangement of the type referred to in the opening paragraphs is shown on the drawing. In it, 1 designates a transmitter for transmitting a modulated light beam 2, the amplitude of which varies in accordance with a modulation oscillation applied to the transmitter from an oscillation source 3. The light beam is projected towards and reflected by a reflecting member located at the other end of the length to be measured and returns as a beam 4, which impinges on the cathode of the photo multiplier 5. The latter contains, in addition to the cathode 6, a number of dynodes 7, 7' etc. as well as an anode 8. The cathode 6 is connected through a resistor 9 to the negative terminal of a voltage source E, the positive terminal of which is grounded. Across the source E there is connected a series of resistors, three of which are indicated on the drawing and designated 10, 11, 12 and which form a voltage divider, to the tappings of which the various dynodes are connected. Each dynode is furthermore grounded for alternating voltages through a condenser such as 13, 14 and 15. The anode 8 is similarly grounded through the parallel connection of a resistor 16 and a condenser 17 and is further connected to a measuring instrument 18 for measuring the output current of the multiplier.

The oscillation of the oscillation source 3 is translated to a delay network 19, the output of which is applied via a transformer 20 to a condenser 21, the one plate of which is grounded whereas the other plate is connected through a D.C. blocking condenser 22 to the cathode 6.

Experiments have been performed and have indicated that it is of fundamental importance for the satisfactory function of the invention that the condensers 13, 14 etc. are large enough for the voltages of the dynodes 7, 7' etc. to be free from high frequency fluctuations.

The described arrangement operates as follows. The measuring instrument 18 gives an indication, which is assumed to represent the mean value of the current flowing from the anode 8. The strength of the incoming light beam 4 varies at a certain frequency and the sensitivity of the multiplier varies at the same frequency but possibly with different phase owing to the voltage applied to the cathode from the oscillation source 3. The delay network 19 is adjustable to such a value that the instrument 18 gives a maximcm or a minimum indication. This corresponds to a phase difference of 0° or 180°, respectively, between the oscillation which is impressed on the incoming light beam 4 and the oscillation exhibited by the sensitivity of the tube. If, for instance, the tube has its greatest sensitivity when the beam 4 has its greates intensity, it is obvious that the phase difference is 0°. The delay of the light beam from the moment it is transmitted from the light source 1 up to the moment when it is picked up by the cathode 6 then equals the delay of the oscillation during its translation from the oscillation source 3 to the cathode 6, which delay can be assumed to be concentrated to the delay network 19. As in all phase-measuring methods, it is obvious that the result of the measurement is independent of deviations in the delay of the light beam over the path traversed from the measured value amounting to an integral multiple of 360°.

What is claimed is:

1. Apparatus for phase measurements comprising a photomultiplier having an anode, a cathode and a plurality of dynodes, means for varying the sensitivity of said photomultiplier in accordance with a phase reference oscillation, said means including means for impressing the reference voltage on at least one electrode of the photomultiplier and means for maintaining a constant voltage between the anode and at least one dynode including the dynode adjacent the anode.

2. Apparatus for phase measurements comprising a photomultiplier having an anode, a cathode and a plurality of dynodes, means for varying the sensitivity of said photomultiplier in accordance with a phase reference oscillation, said means including means for impressing the reference voltage on the cathode of the photomultiplier and means for maintaining a constant voltage between the anode and at least one dynode including the dynode adjacent the anode.

3. Apparatus for phase measurements comprising a photomultiplier having an anode, a cathode and a plurality of dynodes, means for varying the sensitivity of said photomultiplier in accordance with a phase reference oscillation, said means including means for impressing the reference voltage on at least one electrode of the photomultiplier and means for maintaining a constant voltage between the anode and all of said dynodes.

References Cited in the file of this patent

UNITED STATES PATENTS

| | | | |
|---|---|---|---|
| 2,173,994 | Anderson | Sept. | 26, 1939 |
| 2,231,676 | Muller | Feb. | 11, 1941 |
| 2,234,329 | Wolff | Mar. | 11, 1941 |
| 2,290,775 | Snyder | July | 21, 1942 |
| 2,594,703 | Wouter | Apr. | 29, 1952 |
| 2,625,653 | Wouters | Jan. | 13, 1953 |
| 2,630,736 | Beitz | Mar. | 10, 1953 |
| 2,768,309 | Phillips | Oct. | 23, 1956 |
| 2,846,500 | Neeb | Aug. | 5, 1958 |